Patented June 7, 1932

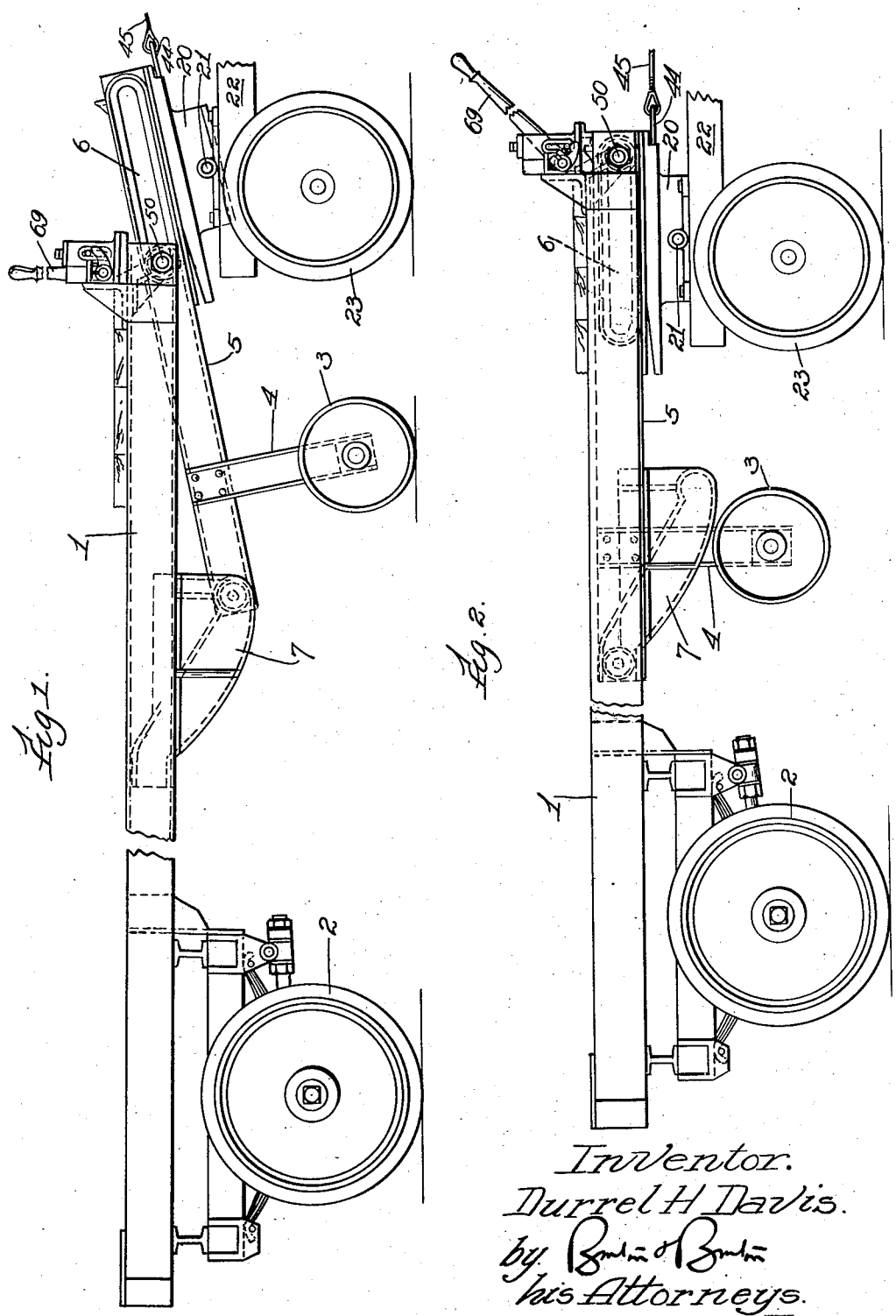

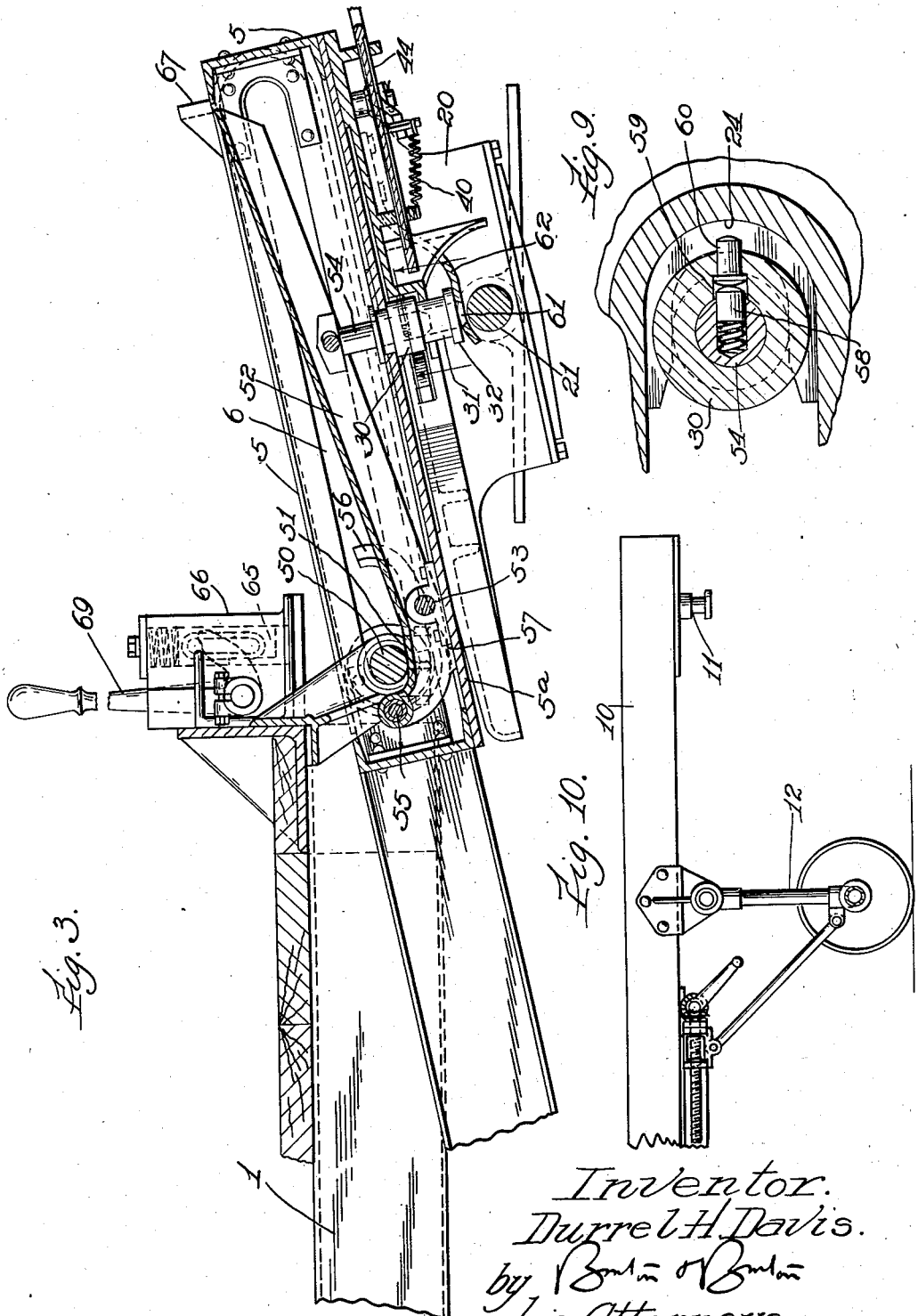

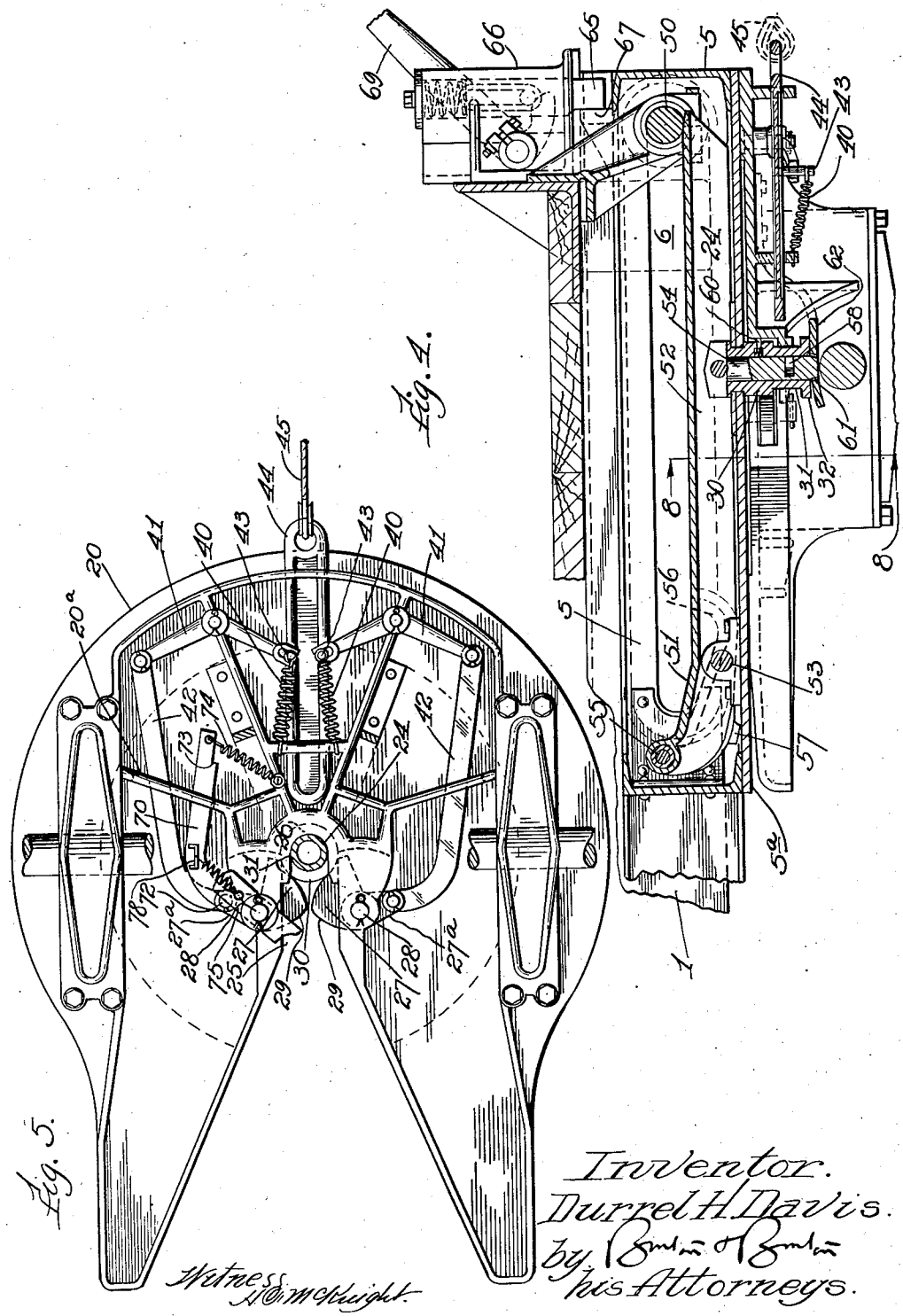

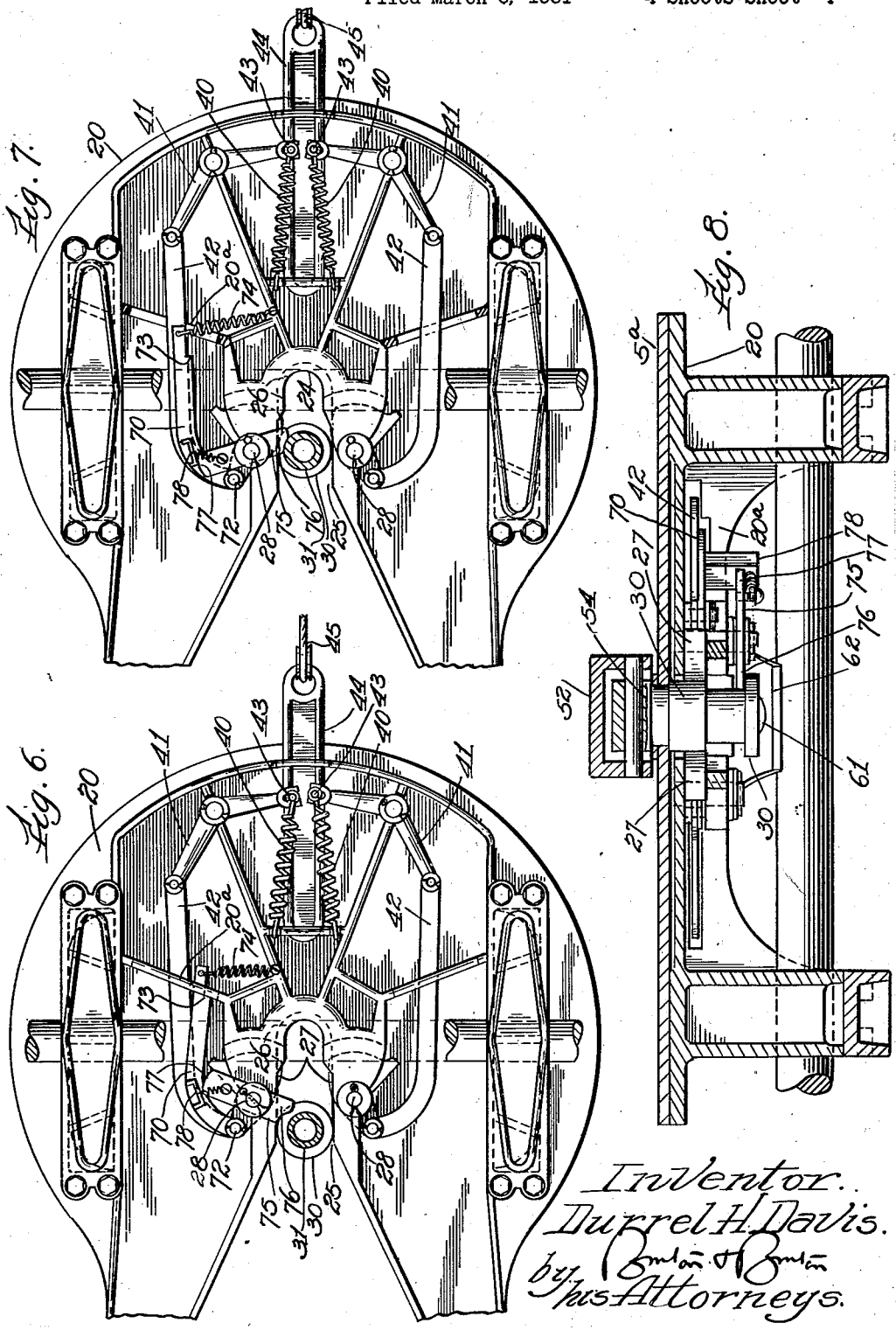

1,862,112

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

AUTOMATIC FIFTH WHEEL FOR SEMITRAILERS

Application filed March 6, 1931. Serial No. 520,504.

The purpose of this invention is to provide a coupling structure for semi-trailers adapted for mounting on the tractor vehicle and arranged to cooperate with more than one type of existing semi-trailer coupling mechanism. It consists in certain features and elements of construction in combination as herein shown and described, and as indicated by the claims.

In the drawings:

Figure 1 is a somewhat diagrammatic side elevation representing a tractor and a trailer at an intermediate stage in the process of coupling or uncoupling.

Figure 2 is a similar diagrammatic side elevation showing the tractor and trailer of Figure 1 in fully coupled relation.

Figure 3 is a medial section taken longitudinally through the coupling members, with the parts substantially in the position illustrated in Figure 1.

Figure 4 is a similar section showing the parts in the position illustrated in Figure 2.

Figure 5 is a bottom plan view of the lower coupling member or fifth wheel indicating the relation of the parts corresponding to Figure 4.

Figure 6 is a bottom plan view similar to Figure 5 showing the relation of the parts in uncoupled position, with the king pin of the trailer just entering the slot.

Figure 7 is a similar bottom plan view showing the king pin farther advanced into the slot for actuating the trip device which releases the locking jaws.

Figure 8 is a transverse section taken substantially as indicated at 8—8 on Figure 4.

Figure 9 is a detail section taken through the king pin for showing the operation of the plunger detent therein.

Figure 10 is a partial side elevation similar to Figures 1 and 2, illustrating the second type of trailer adapted to cooperate with the tractor coupling member to which this invention relates.

Figures 1 and 2 may be understood as showing a trailer structure substantially like that of United States Letters Patent No. 1,785,697, in which the frame, 1, is supported on a pair of rear wheels, 2, and when uncoupled from the tractor is provided with a temporary support near the forward end, including ground-engaging wheels, 3, vertically extending legs, 4, and a longitudinally extending auxiliary frame, 5, to which the legs, 4, are rigidly attached. The frame, 5, is slotted at 6 to permit its forward end to travel telescopically into and out of the main frame, 1, and the rear end of the auxiliary frame, 5, is fitted with guide rollers which travel on a cam track, 7, by which the rear end of said frame, 5, is guided downwardly when its forward end is pulled out from the main frame, 1, thus bringing the temporary supporting wheels, 3, to the ground in position for carrying the load of the front end of the trailer. In the patented structure above referred to the tractor vehicle is fitted with a lower fifth wheel or coupling mechanism which cooperates with the forward end portion of the auxiliary frame, 5, and said frame carries a hollow king pin having a telescopically mounted plunger. When the vehicles are to be uncoupled the brakes are set on the trailer and the tractor vehicle starts to pull away. The first effect of this movement is to draw out the auxiliary frame, 5, from within the frame, 1, thus lowering the wheels, 3, to a position like that shown in Figure 1, and the mechanism is so arranged that the plunger portion of the king pin maintains engagement with the tractor-carried coupling member until the auxiliary frame is thus fully extended; thereafter the plunger is withdrawn into the hollow king pin and thus releases the tractor, allowing it to uncouple and pull away from the trailer.

Another type of semi-trailer vehicle is illustrated in Figure 10, in which the temporary supporting means at the forward end is not operated automatically in the coupling or uncoupling action, but may be manually lowered to supporting position before the vehicles are uncoupled. In this type the forward end of the frame, 10, is simply provided with a depending king pin, 11. Except for certain added features the tractor-carried coupling member of the present invention, which is in effect a lower fifth wheel, is similar to that which is already in use for cooperating with this simple form of king pin, 11. Said lower fifth wheel is indicated in Figures 1 and 2 at 20, being tiltably mounted on the trunnions, 21, carried by the frame, 22, of the tractor vehicle whose rear wheels are shown at 23.

Figure 5 shows the under side of this tractor-carried fifth wheel, 20, with a hollow king pin, 30, of the type used on the trailer of Figures 1 and 2, positioned in the central recess, 24, in which any king pin is lodged in fully coupled position. This king pin and any other intended to cooperate with the fifth wheel, 20, such as the king pin, 11, of Figure 10, is provided with a head at its lower end which results from the formation of a reduced portion, 31, slightly smaller than the main shank, 30. The latter part enters the central recess of the fifth wheel, 20, through a rearwardly opening radial slot, 25, and the forward part of this slot is formed with a flange, 26, which checks the head, 32, of the king pin against upward movement and embraces the reduced portion, 31, of the king pin. In its coupled position the king pin is locked in a central recess by means of a pair of jaws, 27, pivoted on pins, 28, at opposite sides of the slot, 25. The shank portion, 30, of the king pin forces said jaws apart by encounter with their outer cam faces, 29, and the jaws are returned to locking position by springs, 40, acting upon levers, 41, which are connected through links, 42, with the trail portions, 27ª, of the jaw members. The springs, 40, are attached to posts or pins, 43, set in a slide member, 44, and serving as pivoted connections between said slide and the ends of the levers, 41. When a fifth wheel of this type is coupled to a simple king pin, 11, of the type shown in Figure 10, the uncoupling of the tractor and trailer is accomplished by pulling forward on the cable, 45, attached to the slide, 44, thus rocking the levers, 41, in a direction for swinging the jaws, 27, to open position and releasing the king pin therefrom as the tractor pulls away from the trailer. This of course is done only after the temporary support, such as that indicated at 12 on Figure 10, has been lowered into ground-engaging position.

The same type of tractor-carried fifth wheel, 20, is adapted to cooperate with the mechanism of the auxiliary frame, 5, by virtue of a very slight addition to the structure already described. When a trailer of the type shown in Figure 1 is left standing after uncoupling of the tractor vehicle the frame, 5, is disposed in the inclined position shown in Figures 1 and 3. The frame having been drawn out to its extreme limit the cross rod, 50, which extends through the slots, 6, engages the rear portion of the upper face, 51, of a lever arm, 52, which lever arm is fulcrumed at 53, slightly forward of the point of such engagement. The lever, 52, pivotally carries the plunger, 54, which operates vertically in the hollow king pin, 30, and with the parts in the position shown in Figure 3 the pressure of the rod, 50, on the rear end of the lever, 52, elevates the forward end and with it the plunger, 54. The extreme rear end of the lever, 52, is pivotally connected at 55 to a hook-shaped lever, 56, which is rockably mounted on the bottom plate, 5ª, of the frame, 5, by means of a fulcrum boss, 57; depression of the rear end of the lever, 52, thus depresses the rear end of the lever, 56, and elevates its hook-shaped terminal into a position in which it would encounter the cross rod, 50, if the auxiliary frame, 5, were moved rearwardly a short distance. Thus the hook, 56, serves as a safety device to prevent the frame, 5, from being telescoped into the frame, 1, until a satisfactory coupling relation has been established between the king pin, 30, and the tractor carried fifth wheel, 20.

The function of the safety hook, 56, is insured by providing in the plunger, 54, a spring-pressed detent, 58, which engages in a recess, 59, of the hollow king pin, 30, when the lever, 52, is elevated in the position shown in Figure 3; and in fact the engagement of said detent 58, in the recess, 59, positively prevents lowering of the lever, 52, and thus prevents lowering of the hook, 56. But as the king pin, 30, advances in the slot, 25, to its final position shown in Figure 5, a trip plunger, 60, projecting through the wall of the hollow plunger, 30, in alignment with the recess, 59, and detent, 58, strikes the curved recess, 24, in which the slot, 25, terminates and serves to force back the detent, 58, within the cylindrical outline of the plunger, 54, and thus out of engagement with the recess, 59 Further backing movement of the tractor vehicle continues the pressure of the recess, 24, against the king pin, 30, and thus starts the auxiliary frame, 5, sliding rearwardly within the frame, 1, of the trailer. The detent, 58, having been released, this sliding movement of the frame, 5, carries the forward end of the lever, 52, under the cross rod, 50, and forces the plunger, 54, downwardly through the hollow king pin, 30, into an aperture, 61, in a plate, 62, which extends just below the head of the king pin, 30. The lowering of the lever, 52, is accompanied by lowering of the hook, 56, so that the rearward sliding of the frame, 5, may continue to completion, at which it is telescoped completely within the frame, 1, as shown in Figure 4, and at which position it is retained by latches, 65, which are spring-pressed downwardly in the sockets, 66, mounted on said main frame, 1, and which engage abutments, 67, upstanding from the forward end of the auxiliary frame, 5

In the uncoupling operation the hand lever is rocked rearwardly to raise the latches, 65, as indicated in Figure 3. The brakes of the trailer wheels, 2, may be interconnected with the lever, 69, so as to be set simultaneously with this release of the latches, or may be separately set, and then the next step is to drive the tractor forwardly so as to draw out the auxiliary frame, 5, into its inclined position and thus lower the temporary supports to the ground. With the fifth wheel member, 20, including jaws, 27, as shown in Figure 5, this extension of the frame, 5, could be accomplished merely by leaving the jaws in locked position, but with the plunger, 54, engaging the aperture, 61, of the plate, 62, this is unnecessary, since sufficient traction will be provided through the plunger, 54. Therefore, the jaws, 27, are arranged so that they may be locked open and will thus immediately release the king pin, 30, as soon as the auxiliary frame, 5, has been fully extended into the position shown in Figure 3, which results in the upward withdrawal of the plunger, 54, from the aperture plate, 62. The locking of the jaws in open position is accomplished by means of a detent lever, 70, fulcrumed on the pivot, 72, which connects one of the links, 42, to the tail of one of the jaws, 27. The detent lever is formed with a shoulder, 73, and extends through a slot in one of the ribs, 20ª, which reinforces the fith wheel member, 20, and a spring, 74, swings the detent lever, 70, in this slot, so that its shoulder, 73, abuts the rib, 20ª, beyond the end of the slot, as seen in Figure 6. Thus when the slide member, 44, is drawn forward, as by means of a cable, 45, extending to the driver's cab, if desired the jaws, 27, are swung back and are held in this open position by the detent lever, 70. This permits automatic release of the trailer, since the auxiliary frame, 5, has reached its forward limit and brought the temporary supports into operative position.

Now for coupling this type of trailer automatically when the jaws, 27, have been left thus locked open on the tractor-carried member, 20, there is provided a trip lever, 75, which may be seen fulcrumed on the pivot, 28, of one of the jaws, 27, and having one end, 76, projecting into the path of the king pin of the trailer as it enters the slot, 25, in the fifth wheel, 20. As shown, the trip lever is designed to engage the reduced portion, 31, of the king pin, since it is most conveniently located at some distance below the plane of the jaws, 27, and will thus register with said reduced portion, 31. When this part of the king pin strikes the end, 76, of the lever, 75, it swings the lever about its pivot, 28, and forces the opposite end, 77, cam-wise against an abutment, 78, upstanding from the detent lever, 70, as shown in Figure 7. This swings the detent lever sufficiently to release its shoulder, 73, from its engagement with the rib, 20ª, and thus permits the springs, 40, to function for closing the jaws, 27. This trip action which releases the jaws takes place while the king pin is traveling forwardly into the slot, 25, so that by the time the jaws are released the king pin will have substantially reached the curved recess, 24, in which the slot terminates, and the detent plunger, 58, being released will permit lowering of the king pin plunger, 54, into engagement with the aperture, 61, of plate, 62, as already described. This lowering of the plunger, 54, of course proceeds only as the frame, 5, is pushed back telescopically into the frame, 1, but even before this last motion is commenced the jaws, 27, will have snapped into position, thus insuring a safely coupled relation of the parts.

It will be evident that if the plate, 62, be omitted from the structure this will merely require the operator, in the uncoupling operation, to refrain from pulling the cord or cable, 45, and opening the jaws, 27, until the auxiliary frame, 5, has been drawn out to the limit at inclined position, as shown in Figure 1. When this has been done, so that the supporting wheels, 3, have been lowered into operative position, the jaws may be opened and the tractor can pull away from the trailer. The inclusion of the plate, 62, with its aperture, 61, and the design of the plunger, 54, to extend into said aperture, 61, is therefore a preferential feature which may be omitted but which involves such a simple structural addition to the remainder of the device that it is hardly worth while to omit it in view of the increased simplicty of operation which results.

I claim:

1. A fifth wheel structure for coupling two vehicles and comprising separable upper and lower sections, one having a movably mounted projecting king pin and the other an opening to receive the king pin, said opening extending radially outward to the periphery of the section, retaining means normally closing said opening intermediate its ends to form a socket for said pin, mechanism on one of the vehicles, means connected with said movable king pin for actuating said mechanism as a part of the coupling cycle, a detent associated with the king pin arranged to prevent such actuation until the king pin is seated in the socket, and a trip device for holding said retaining means locked open to avoid actuation of the detent thereby, said trip device being positioned to be released by the passage of the king pin as it enters the socket.

2. A fifth wheel structure for coupling a tractor and trailer comprising a lower section on the tractor, and an upper section on the trailer, said upper section having a projecting king pin mounted movably on the trailer, and means connecting said king pin with other mechanism on said trailer for actuating it during the coupling cycle, the fifth wheel section on the tractor having a rearwardly open slot terminating in a recess to receive the king pin, locking means movable transversely of said slot to form a socket for said pin and hold it in working position, together with means on the trailer for checking the king pin against movement thereon, releasable upon engagement of the lower section, yielding in the recess of the lower section, yielding means for urging said retaining means toward closed position, and means for latching the retaining means open, releasable by the passage of the king pin as it enters the recess.

3. In combination with a tractor and a semitrailer, a fifth wheel structure for coupling the two vehicles together comprising a lower plate on the tractor having a recess to receive the king pin, and a rearwardly extending radial opening leading to said recess with retaining means normally closing said opening intermediate its ends to hold the pin in working position, temporary supporting means for the forward end of the trailer, and longitudinally movable mechanism on the trailer associated with said support for raising and lowering it, said king pin being connected to said mechanism and adapted for actuating it by the rearward thrust of the tractor in the coupling action, a plunger slidably carried in the king pin and interconnected with said mechanism to be thrust downwardly through the king pin when the mechanism moves rearwardly on the trailer, the connection including means for checking such rearward movement of the mechanism while the plunger remains in its upper position, a detent in the hollow king pin serving to retain the plunger in its upper position, and means for releasing said detent when the king pin seats in the recess, and means for closing the retaining means as the king pin enters said recess.

4. In the combination defined in claim 3, said means for releasing the detent comprising a trip plunger projecting from the forward face of the hollow king pin for engagement with the wall of the recess and depressible to force the detent out of engagement with the hollow king pin.

5. A tractor fifth wheel for use with semitrailers of two different types which are fitted respectively with a fixed king pin and with a king pin mounted for longitudinal movement on the trailer for actuating other mechanism thereon, said tractor fifth wheel comprising a plate-like structure having a central recess with a rearwardly open radial slot leading thereto, and having a pair of movable jaws normally closing said slot intermediate its ends to form a socket for either king pin, said jaws being yieldable to permit passage of the fixed king pin through the slot but not out of said socket, a detent associated with the movable king pin arranged to prevent actuation of the associated mechanism until the king pin is seated in the socket, said detent including a trip member carried by said movable king pin substantially in the plane of said locking jaws for contact with the wall of the recess, and means operable at will for latching said jaws in open position to permit entry of the said movable king pin without contact with said jaws so as to avoid actuation of the tip member, together with means for releasing said latch by the passage of said king pin as it enters the socket.

6. In the combination defined in claim 3, said lower plate carrying a member which extends below the end of the hollow king pin and is apertured to receive the plunger, together with means for locking said retaining means in open position, whereby the engagement of the plunger in the aperture will provide temporary traction for effecting the longitudinal movement of the mechanism associated with the king pin.

7. In the combination defined in claim 1, said retaining means comprising a pair of pivoted jaws and linkage connecting them together for swinging them simultaneously about pivotal mountings at opposite sides of the said opening for moving said jaw portions substantially clear of the opening or in positions extending across it, and said trip device including an arm pivotally attached to one of the jaw members and formed with a shoulder positioned to engage a fixed abutment on the section in which the opening is formed, together with a spring urging said arm to such engaging position when the jaws are swung to open position.

8. In the combination defined in claim 1, said retaining means comprising a pair of pivoted jaws and linkage connecting them together for swinging them simultaneously about pivotal mountings at opposite sides of the said opening for moving said jaw portions substantially clear of the opening or in positions extending across it, and said trip device including an arm pivotally attached to one of the jaw members and formed with a shoulder positioned to engage a fixed abutment on the section in which the opening is formed, together with a spring urging said arm to such engaging position when the jaws are swung to open position, said device including also a release lever fulcrumed coaxially with one of the jaws and extending into the path of the king pin as it advances in the opening toward the socket portion thereof, whereby said lever is swung about its fulcrum and another portion of the lever forces the said arm out of engagement with the abutment to permit said jaws to close under the influence of spring means associated with their connecting linkage.

9. In the combination defined in claim 1, said retaining means comprising a pair of pivoted jaws and linkage connecting them together for swinging them simultaneously about pivotal mountings at opposite sides of the said opening for moving said jaw portions substantially clear of the opening or in positions extending across it, and said trip device including an arm pivotally attached to one of the jaw members and formed with a shoulder positioned to engage a fixed abutment on the section in which the opening is formed, together with a spring urging said arm to such engaging position when the jaws are swung to open position, spring means associated with the linkage normally urging said jaws to closed position, and a manually operable member for swinging them open in opposition to said spring means.

10. In combination with a semi-trailer having a temporary supporting structure for its forward end adjustable into and out of supporting position, a fifth wheel device for coupling the trailer to a tractor and comprising separable upper and lower sections, one having a projecting king pin and the other an opening to receive the king pin, said opening extending rearwardly outward to the periphery of the section, transversely movable retaining means normally closing said opening to form a socket for said pin to hold it in coupled relation, and mechanism associated with said pin arranged to prevent the adjustment of the temporary supporting structure out of supporting position except when the pin is disposed in coupling position in said socket.

DURREL H. DAVIS.